(12) United States Patent
Pihlblad

(10) Patent No.: US 9,296,363 B2
(45) Date of Patent: Mar. 29, 2016

(54) ARRANGEMENT FOR DRYING PAINT

(71) Applicant: Ronny Pihlblad, Veddige (SE)

(72) Inventor: Ronny Pihlblad, Veddige (SE)

(73) Assignee: PIVAB AB, Veddige (SE)

( * ) Notice: Subject to any disclaimer, the term of this patent is extended or adjusted under 35 U.S.C. 154(b) by 111 days.

(21) Appl. No.: 14/364,136

(22) PCT Filed: Dec. 19, 2012

(86) PCT No.: PCT/SE2012/051423
§ 371 (c)(1),
(2) Date: Jun. 10, 2014

(87) PCT Pub. No.: WO2013/095274
PCT Pub. Date: Jun. 27, 2013

(65) Prior Publication Data
US 2015/0068057 A1    Mar. 12, 2015

(30) Foreign Application Priority Data

Dec. 20, 2011   (SE) ...................................... 1130125

(51) Int. Cl.
*F26B 3/28*         (2006.01)
*B60S 3/00*         (2006.01)
(Continued)

(52) U.S. Cl.
CPC . *B60S 3/002* (2013.01); *F26B 3/28* (2013.01); *F26B 25/06* (2013.01); *B05D 3/0254* (2013.01); *B05D 7/14* (2013.01); *F26B 2210/12* (2013.01)

(58) Field of Classification Search
CPC ................ F26B 3/00; F26B 3/20; F26B 3/28; F26B 25/00; F26B 25/06; F23G 5/00; F23G 5/44; F27B 7/00; F27B 7/14; F27B 9/00

USPC ............ 34/666, 201, 210, 218; 110/255, 289; 432/147, 148; 15/312.1, 316.1, 366
See application file for complete search history.

(56) References Cited

U.S. PATENT DOCUMENTS 4,335,526 A * 6/1982 Smith ..................... B60S 3/002
                                                    239/587.5
4,635,381 A * 1/1987 Hubbert .................. F26B 3/283
                                                    34/225
(Continued)

FOREIGN PATENT DOCUMENTS

DE          4127580 C1 *  2/1993 .......... B05B 13/0235
DE       19518308 A1 * 11/1995 .............. B05C 11/08
(Continued)

OTHER PUBLICATIONS

International Search Report issued in PCT/SE2012/051423, Feb. 26, 2013, pp. 1-3.

*Primary Examiner* — Stephen M Gravini
(74) *Attorney, Agent, or Firm* — Jeffrey S. Melcher; Manelli Selter PLLC

(57) ABSTRACT

The present invention relates to an arrangement for drying paint or lacquer on a product, which arrangement is intended to be disposed in a suitable installation space with a support surface for processing the product. The arrangement comprises a drying arch with drying elements extending over the installation space. The drying arch is divided into two arch segments, wherein the two arch segments are mounted at a respective one of two sides opposing each other of the installation space, on a respective actuating unit. The actuating units are arranged at the support surface and comprise, on the one hand, means for moving the actuating unit with its arch segment along its side of the installation space, and, on the other hand, means for tilting the arch segment mounted to the actuating unit at the respective side of the installation space, as well as means for displacing the arch segment mounted to the respective actuating unit outward and inward relative to the installation space and the opposite side thereof.

4 Claims, 2 Drawing Sheets

(51) Int. Cl.
*F26B 25/06* (2006.01)
*B05D 7/14* (2006.01)
*B05D 3/02* (2006.01)

(56) References Cited

U.S. PATENT DOCUMENTS

| | | | | | |
|---|---|---|---|---|---|
| 5,144,754 | A | * | 9/1992 | Persson | F26B 21/06 34/233 |
| 5,456,023 | A | * | 10/1995 | Farnan | F26B 21/004 239/71 |
| 5,911,500 | A | * | 6/1999 | Barnett | G01N 21/8806 362/145 |
| 6,154,916 | A | * | 12/2000 | Ayers | B60S 3/002 15/312.1 |
| 6,895,689 | B2 | * | 5/2005 | Ueno | F26B 3/283 34/270 |
| 8,510,968 | B2 | * | 8/2013 | Bunnell | F26B 9/06 114/274 |
| 8,689,458 | B2 | * | 4/2014 | Nowack | B65D 1/22 118/326 |
| 8,756,827 | B1 | * | 6/2014 | Calabro | B05B 15/1222 118/312 |
| 8,850,712 | B2 | * | 10/2014 | Laviolette | F25B 5/042 118/634 |
| 8,997,374 | B2 | * | 4/2015 | Sato | F26B 3/283 118/642 |
| 2011/0061258 | A1 | * | 3/2011 | Kim | F16K 3/24 34/108 |

FOREIGN PATENT DOCUMENTS

| | | | |
|---|---|---|---|
| EP | 2177276 A1 | | 4/2010 |
| JP | 55152568 A | * | 11/1980 |
| WO | 02/084191 A1 | | 10/2002 |
| WO | 2006/010301 A1 | | 2/2006 |
| WO | WO 2013095274 A1 | * | 6/2013 ................ F26B 3/28 |

* cited by examiner

ARRANGEMENT FOR DRYING PAINT

TECHNICAL FIELD

The present invention relates to an arrangement for drying paint or lacquer on a product, e.g. a vehicle, which arrangement is disposed in an installation space having a support surface, a floor or the like, for processing the product, wherein the arrangement comprises a drying arch with drying elements, the drying arch extending over the installation space.

BACKGROUND

Lacquer damages that need repair are common on certain products, especially motor vehicles such as passenger cars. Thereby it is not possible, as in the case of new production, to use a large, hot drying oven, but a directed heat source oriented toward the surface that has been repaired, i.e. repainted or refinished, is used. The heat source usually consists of lamps emitting light, usually IR or UV light, which is converted into heat for drying when it hits the lacquer or lacquer carrier. In this connection, it is known to use simple, manually movable stands supporting the heat source, but also more sophisticated arrangements with mechanically movable arches arranged in various ways.

The patent publication WO02/084191 discloses an arrangement in accordance with the foregoing. A disadvantage of such an arrangement is that it is relatively complicated, but still inflexible when it comes to achieving settings, with regard to distance, height and intensity, in relation to the object which is to be dried. In principle, the known arrangements are cumbersome and not production-friendly. In addition, only one damaged spot can be dried at a time. Furthermore, the design implies that in case of maintenance, one must get up high to be able to perform the maintenance on the installation.

SUMMARY OF THE INVENTION AND ITS ADVANTAGES

According to the invention, the above-mentioned problems are solved in that the drying arch is divided into two arch segments, wherein the two arch segments are mounted at a respective one of two sides opposing each other of the installation space, on a respective actuating unit, which actuating units are arranged at the support surface and comprise, on the one hand, means for moving the actuating unit with its arch segment along its side of the installation space, and, on the other hand, means for tilting the arch segment mounted to the actuating unit at the respective side of the installation space, as well as means for displacing the arch segment mounted to the respective actuating unit outward and inward relative to the installation space and the opposite side thereof.

By means of an arrangement according to the invention, two different surfaces can be dried at the same time. Furthermore, through the flexible setting possibilities with respect to positioning and tilting/angling of the arch segments, the optimal distances for the type of paint or lacquer in question and the desired drying time as well as drying temperature can be selected. The devices can be installed in existing production plants in small areas. Due to the low position of the actuating units, most maintenance tasks can be performed at floor level and the risk of falling dust and debris can be minimized.

In one variant of the invention, each of the arch segments comprises a first portion, mounted closest to the respective actuating unit, extending with a longitudinal direction radially away from a horizontally disposed first axle of the actuating unit, and a second portion extending with its longitudinal direction in over the installation space, in parallel with the direction of the first axle. An arrangement according to this variant is very functional also from a manufacturing point of view, e.g. when mounting drying elements, etc.

Conveniently, the variant above can be completed with an intermediate portion, which is located between the first and the second portion and which, at its ends, connects to the first and second portion, respectively, with an extension therebetween.

Accordingly, with an arrangement according to the invention, the drying of a vehicle with several lacquer repairs can be performed more efficiently, since the two-part arch enables drying of two spots at the same time, and with a great flexibility with respect to drying distance, power and drying angle.

In still another variant of the invention, the arch segments comprise, on their surface facing the installation space, drying elements with a radiation lobe, wherein the drying elements are directed such that their radiation lobes diverge. In combination with the adjustability of the arch segments, this provides a very good homogeneity of the heat radiating on the drying surface.

BRIEF DESCRIPTION OF DRAWINGS

In the following, the invention will be described more closely and explained in connection with an example of an embodiment shown in the accompanying drawings, in which.

DESCRIPTION OF EXAMPLES OF EMBODIMENTS

Figure 1:
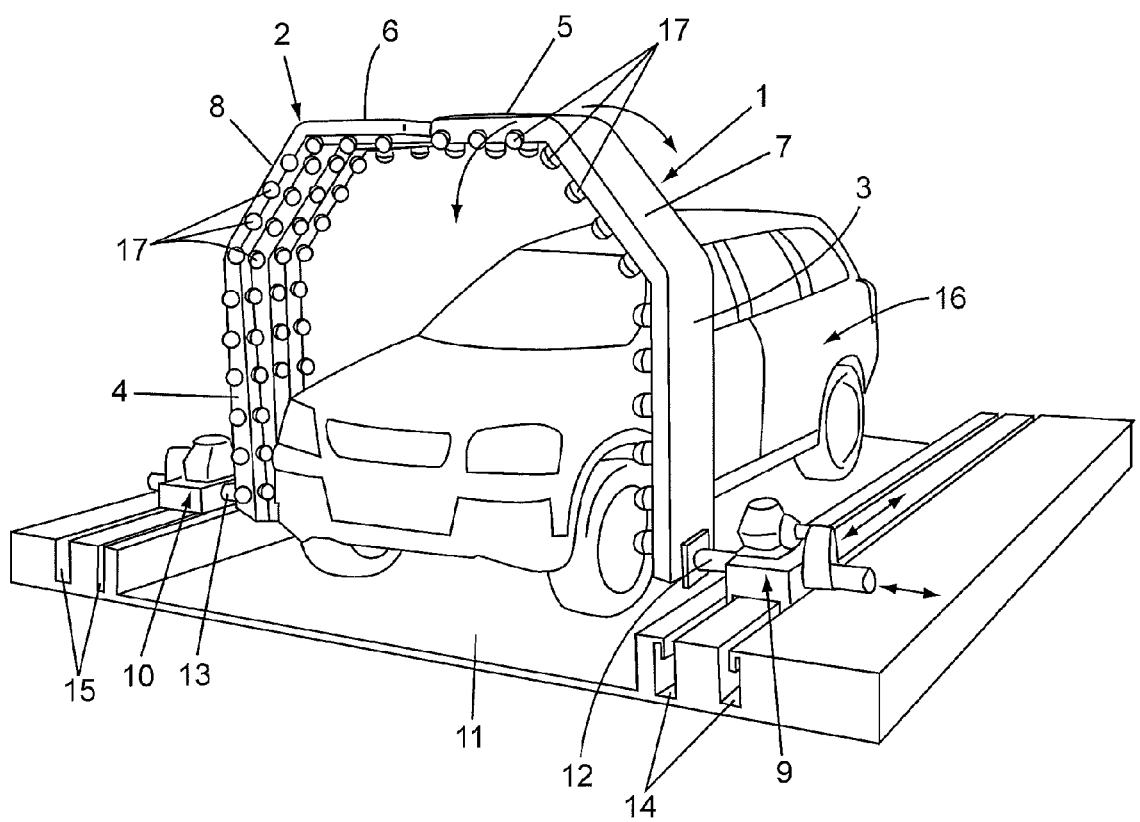
FIG. 1 shows an arrangement according to the invention seen in perspective with the arch segments standing opposite each other.

In the following, a dryer in which an arrangement according to the invention is included will be described. From FIG. 1, it is evident that the arrangement for drying paint or lacquer according to the invention comprises two arch segments 1, 2 which are disposed in a space for supporting or suspending the object having a layer of lacquer which is to be dried.

The arch segments 1 and 2, in their turn, comprise three arch portions, a first and a second arch portion 3, 4 and 5, 6, respectively, and a third arch portion located between them, an intermediate portion 7, 8. In each arch segment 1, 2, the first and the second arch portions have a substantially straight shape, and the direction of the first and of the second arch portion form a substantially right angle with each other. The third arch portion, the intermediate portion 7, 8, which connects ends opposed to each other of the first and the second arch portion, also has a straight shape and forms an approximately 45 degrees angle with the two other arch portions.

At their end facing away from the third arch portion, the first arch portions 3, 4 are mounted to a respective axle 12, 13 of a respective one of two actuating units 9, 10. The actuating units 9, 10 are disposed level with or substantially level with a floor 11 of the installation space by means of a respective pair of guides 14, 15, so that the actuating units can move individually along the floor, substantially in parallel paths to each other and to the floor 11, which is substantially level. The installation space is of course dimensioned for the purposes of the plant with regard to the size of the objects which are to be processed by drying, in this case a schematically shown car 16. The arch segments 1, 2 extend upward from their respective actuating unit and in over the floor 11, when the plant is open for "charging" with the object (or in certain cases objects) the lacquer layer(s) of which is/are to be dried.

The axles 12 and 13 of the actuating units 9, 10 are rotatably and displaceably arranged so that the arch segments 1, 2, on the one hand, can be tilted to different angles relative to the floor, wherein the arch segments 1, 2 are angularly rotated so that they sweep a partial surface of an approximate, truncated sphere, and, on the other hand, can be displaced toward or from a car 16, in relation to its side.

For this purpose, the actuating units 9, 10 comprise motors (not shown), which are adapted to produce rotational and displacement movements of the respective axle 12, 13 and also rolling or sliding movement of the actuating units 9, 10 along the respective guide 14, 15. The movements are illustrated in FIG. 1 by arrows. The motors are advantageously electric and controlled by a central processing unit (CPU).

When it comes to the positioning relative to the surface which is to be dried, the processing unit/CPU can be controlled manually as well as by a computer. Thereby, the processing unit can read and be controlled by data from e.g. contactless distance and surface temperature meters, as well as measuring devices detecting the contour of the object which is to be dried.

Figure 2:
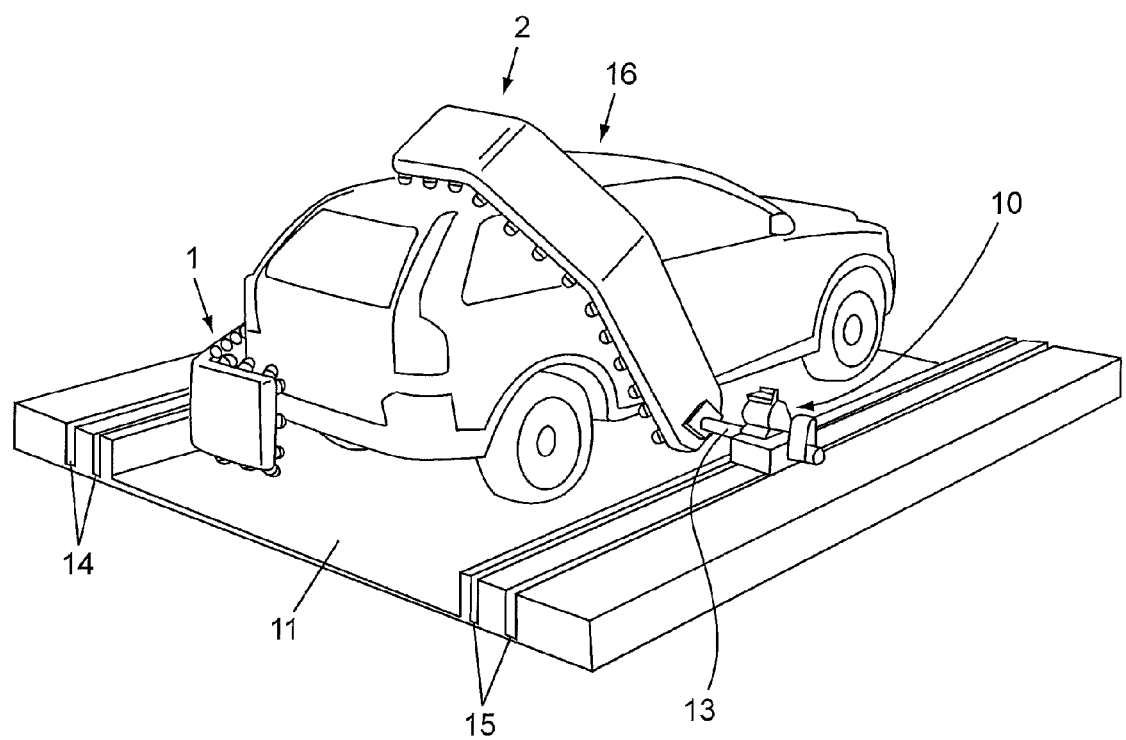
FIG. 2 shows the arrangement of FIG. 1, according to the invention, from another perspective, with the arch segments set at different angles relative to each other and the floor.

From FIG. 2, it is evident how the arch segments 1 and 2 have been positioned for drying a surface at the back as well as a surface on the roof of the car 16 in FIG. 1 by rotating the axles 13 and 12 (obscured), which results in a tilting of the arch segments 1, 2. Accordingly, by means of the axles 12, 13, the arch segments are rotatable at least 180°, and by movement along the guides 14, 15, both the front, the roof as well as the back end of the car 16 can thus be exposed to heat depending on where it has had its lacquer repaired.

Figure 3:
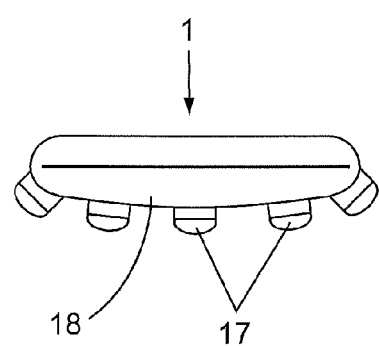
FIG. 3 shows a free end of one of the arch segments.

At their surfaces facing inwardly into the arch, the arch segments 1, 2 comprise a plurality of drying elements, lamps 17, which, when activated, radiate ultraviolet light in a respective lobe. Via electronics, the lamps are individually controllable in respect of radiated power, at least in groups, so that, as far as possible, only the lacquer on the surface which is newly finished and is to be dried will be heated by radiation. From FIG. 3, it is evident, in a view from the free end of a second arch portion 5 of an arch segment 1, how the bottom side 18 is curved so that the lamps 17 get an almost radial distribution along the surface which, in its turn, provides a distributed angling of the lobes of the lamps. The distributed, radial angling can be utilized such that the distance and the combined power of several lamps can be selected by angling the arch segment so that an optimal drying power is achieved in relation to lacquer type, substrate surface and available time. The side of the arch segments upon which the drying elements are placed is slightly curved and can have a radiation-reflecting surface.

The invention is not limited to the example of an embodiment described above and shown in the drawings. For instance, the arrangement can be provided with additional devices so that the arch segments 1, 2 are radially displaceable relative to the axles 12, 13 so that they become longer. The guides can consist of linear motors or be sliding guides. As used herein, lacquer includes all kinds of lacquer types and paints, solid as well as metallic, clear lacquers with or without pigment, and based on water or other solvents. The arch segments can also be disposed overlapping to some degree, so that one can select which one is to be caused to radiate a repaired surface at the central portion of the roof, as long as they do not get into physical interference with each other. The installation space is of course not part of the invention, but is included in the description in order to illustrate how the two arch segments with their actuating units are used in combination to be able to dry all surfaces on an object except a bottom side. Here, the arch segments are shown as identical mirror images of each other, but do not necessarily need to have the same dimensions. The third arch portions can also have the shape of a quarter of a circular arc connecting in line with the extension of the first and second arch portions, respectively, which in themselves also can have a circular arc shape. In this description, the direction indications horizontally, radially, linearly and in parallel, etc. should be construed as if they, in this context, also include insignificant deviations from these terms. Also hydraulics technology can be used in the actuating units.

The invention claimed is:

1. An arrangement for drying paint or lacquer on a product, which arrangement is intended to be disposed in a suitable installation space with a support surface for processing the product, wherein the arrangement comprises a drying arch with drying elements, the drying arch extending over the installation space, wherein the drying arch is divided into two arch segments, wherein the two arch segments are mounted at a respective one of two sides opposing each other of the installation space, on a respective one of two actuating units, which actuating units are arranged at the support surface and comprise, on the one hand, means for moving the actuating unit with its arch segment along its side of the installation space, and, on the other hand, means for tilting the arch segment mounted to the actuating unit at the respective side of the installation space, as well as means for displacing the arch segment mounted to the respective actuating unit outward and inward relative to the installation space and the opposite side thereof.

2. The arrangement according to claim 1, wherein each of the arch segments comprises a first arch portion, mounted closest to the respective actuating unit, extending with a longitudinal direction radially away from a horizontally disposed first axle of the actuating unit, and a second arch portion extending with its longitudinal direction in over the installation space, in parallel with the direction of the first axle.

3. The arrangement according to claim 2, wherein each of the arch segments comprises an intermediate portion, which is located between the first and the second portion and which, at its ends, connects to the first and the second portion, respectively.

4. The arrangement according to claim 1, wherein the arch segments comprise, on their surface facing the installation space, drying elements with a radiation lobe, wherein the drying elements are directed such that their radiation lobes diverge.

* * * * *